Figure 6:
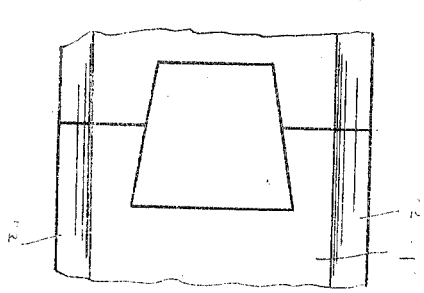

J. S. JOHNSTON.
RIM.
APPLICATION FILED DEC. 6, 1911.
1,068,061.
Patented July 22, 1913.
3 SHEETS—SHEET 1.
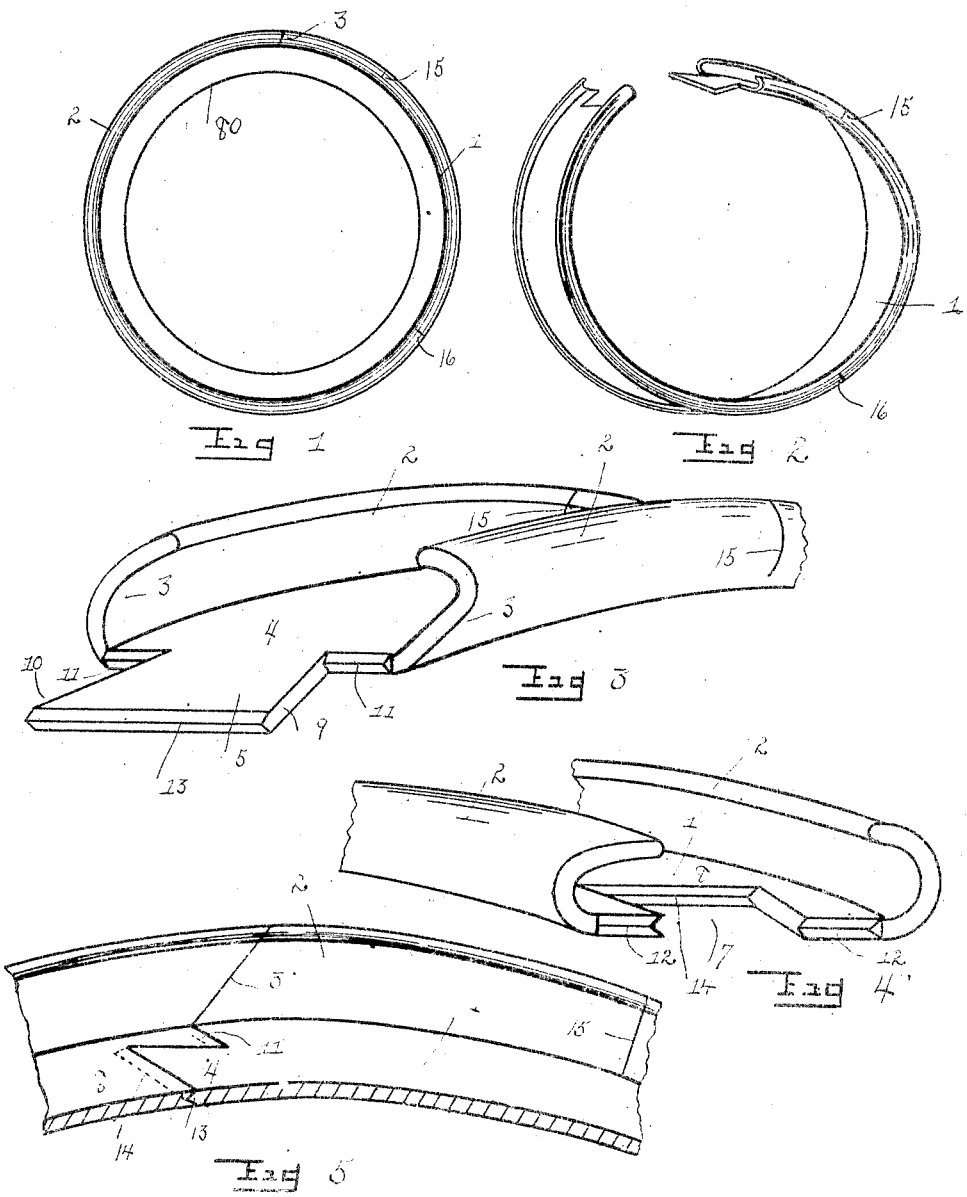
WITNESSES:
INVENTOR
JAMES S. JOHNSTON
BY
ATTORNEY

J. S. JOHNSTON.
RIM.
APPLICATION FILED DEC. 6, 1911.

1,068,061.

Patented July 22, 1913.

3 SHEETS—SHEET 2.

WITNESSES:
Samuel Sloan
David B. Lisle

INVENTOR
JAMES S JOHNSTON
BY Thomas L. Wilder
ATTORNEY

J. S. JOHNSTON.
RIM.
APPLICATION FILED DEC. 6, 1911.

1,068,061.

Patented July 22, 1913.
3 SHEETS—SHEET 3.

WITNESSES:

INVENTOR
JAMES S. JOHNSTON
BY
ATTORNEY.

UNITED STATES PATENT OFFICE.

JAMES S. JOHNSTON, OF UTICA, NEW YORK.

RIM.

1,068,061.  Specification of Letters Patent.  Patented July 22, 1913.

Application filed December 6, 1911. Serial No. 664,214.

*To all whom it may concern:*

Be it known that I, JAMES S. JOHNSTON, a citizen of the United States, residing in Utica, in the county of Oneida and State of New York, have invented certain new and useful Improvements in Rims, of which the following is a specification.

My invention relates to a rim and I declare the following to be a full, clear, concise and exact description thereof, sufficient to enable any one skilled in the art to which it appertains to make and use the same, reference being had to the accompanying drawings in which like reference characters refer to like parts throughout.

The object of the invention is to provide a rim for vehicles that will be of simple and efficient construction, and adapted for the quick detachment of a pneumatic or other tire carried by said rim.

The rim is of the ordinary clencher type and may be constructed of a single piece of metal having its free ends detachably connected by a dove-tail joint. The end portions being preferably cut on a bevel whereby to more readily center the contacting ends when same are assembled. The means for connecting the detachable ends avoids any unevenness to either the upper or lower surface of the base portion of the rim. The under surface of the base portion of the rim being unbroken, the same may be mounted upon the felly without cutting any recesses therein. This feature of the evenness of surface of the base of the rim being of especial advantage in view of the fact that any cutting of the felly to house projections from a rim tends to weaken said felly. Said rim is also provided with means whereby the end portions may easily yield, so as to be disconnected.

Figure 7:
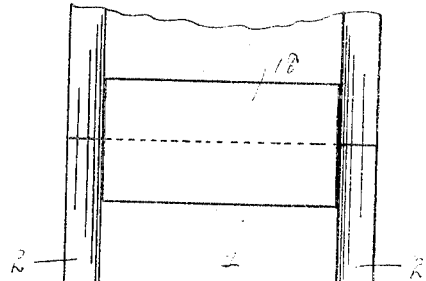
Figure 8:
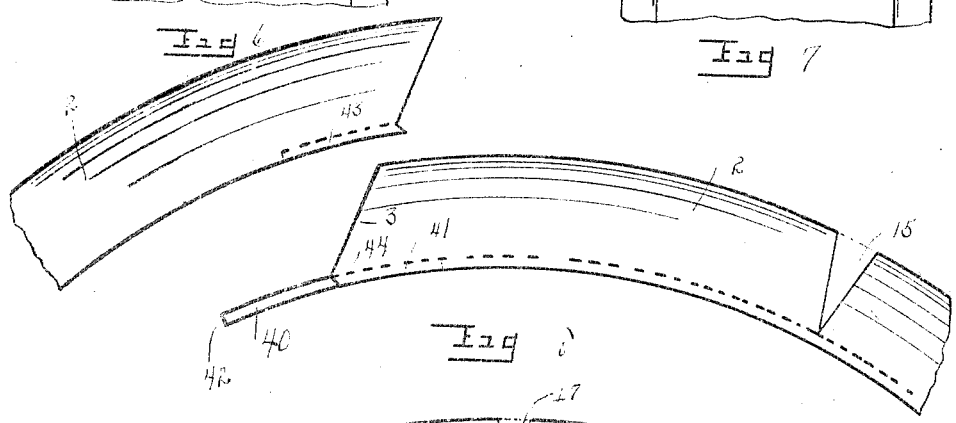
Figure 9:
Figure 10:
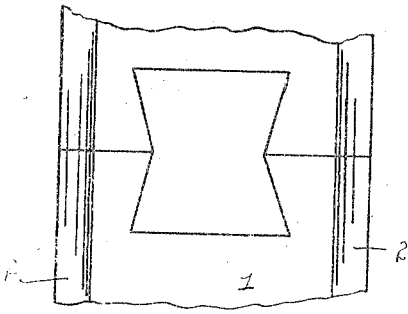
Figure 11:
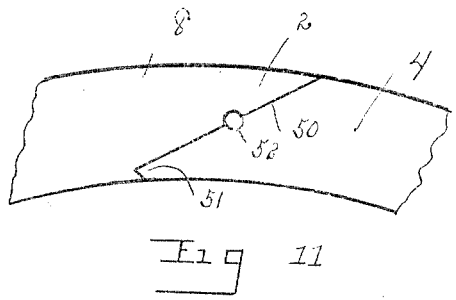
Figure 12:
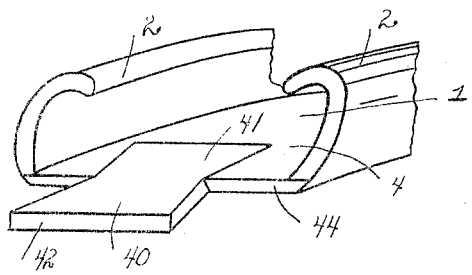
Figure 13:
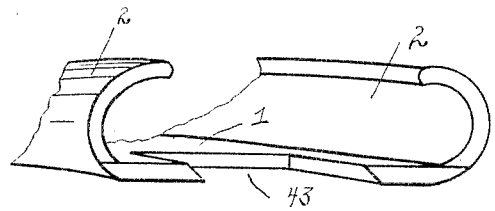
Figure 14:
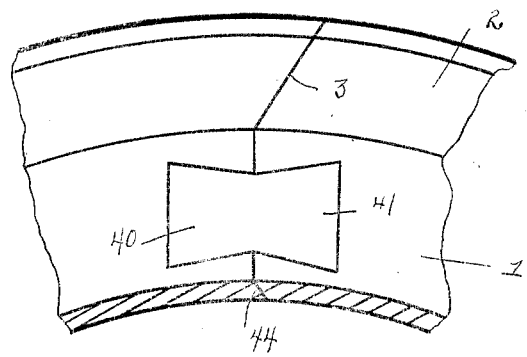

Other features will be disclosed by referring to the drawings in which:

Figure 1 is a side elevation of the rim showing same mounted upon a felly; Fig. 2 is a perspective view of the rim showing the ends detached; Fig. 3 is an enlarged fragmentary view of the rim showing one of the free ends; Fig. 4 is an enlarged fragmentary view of the rim showing the corresponding end to that shown in Fig. 3; Fig. 5 is an enlarged fragmentary view of the rim showing a central circumferential section; Fig. 6 is an intermediately enlarged fragmentary portion of the rim showing a plan view looking upon the inner surface thereof; Fig. 7 is an intermediately enlarged fragmentary portion showing a plan view, looking upon the inner surface of the rim slightly modified; Fig. 8 is an enlarged fragmentary portion in elevation showing the ends detached; Fig. 9 is an enlarged fragmentary portion of the rim in elevation, showing said rim under strain and also another view of the modification illustrated in Fig. 7; Fig. 10 is an intermediate enlarged fragmentary portion of the rim showing a plan view looking upon the inner surface as modified; Fig. 11 is an enlarged fragmentary view in elevation of the rim, showing a modification; Fig. 12 is an enlarged fragmentary view of the rim, showing a certain modification with respect to the manner of cutting the ends; Fig. 13 is an enlarged fragmentary view of the rim showing the end corresponding to that shown in Fig. 12; Fig. 14 is an enlarged fragmentary view of the rim, showing a perspective view partially in section.

Referring more particularly to the drawings, the base portion of the rim proper is represented by 1 and is provided with the ordinary clencher flanges 2—2. Said flanges 2—2 are split at 3 preferably on a bevel whereby the adjacent end portions may be more readily and conveniently united when the ends are assembled. One of the ends 4 of the base portion 1 of the rim is formed with a projection 5 which may be integral with the base portion 1 or if desirable may comprise a separate piece secured in a rigid manner to said base portion 1 of said rim. The projection 5 is formed with its lateral sides spreading in opposite directions, so as to form a dove-tailed joint with the corresponding recess 7 in the other end 8 of rim 1. End 4 of base portion 1 of the rim has formed therein, adjacent either side 9 and 10 of projection 5, triangular shaped wedges 11—11, adapted to fit into corresponding recesses 12—12 in end 8 of the base portion 1 of the rim. Likewise, the extreme outer end of projection 5 is formed with a triangular shaped wedge 13, adapted to fit or be housed in the corresponding recess 14 in end 8 of base portion 1. Said wedge shaped projections 11 and 13 and the corresponding recesses 12 and 14 are adapted for conveniently centering the ends 4 and 8, when the rim is assembled. A short distance to the right of the location, where the rim is split, flanges 2—2 are cut, as at 15—15. Cuts 15—15 extend clear through flanges 2—2 and terminate flush with the upper surface of the base portion 1. Similarly, at substantially one-third the distance along the rim from cuts 15—15 in flanges 2—2, are cuts 16—16, in all respects like cuts 15—15. The function of cuts 15—15 and 16—16 is to permit a give or yield to base portion 1 of the rim, so that end 4 may be easily pushed downward free from its housing in end 8, when it is found desirable to remove the tire from off the rim. The freeing of end 4 from end 8 will permit the circumference of the rim to be contracted, because of the overlapping of the ends 4 and 8 in this mentioned disposition thereof. Cuts 15—15 and 16—16 in flanges 2—2 have been found very effective for permitting the base portion 1 to yield sufficiently for the detachment of end portions 4 and 8. However, there is shown in Figs. 7 and 9, a modification of the manner of cutting the rim to obtain this yield. The modification embodies transverse cuts 17—17 extending clear through flanges 2—2 and base portion 1. The portion of the rim thus cut is held together by plates 18, brazed, welded or otherwise rigidly secured to the adjacent portions of the base 1 of the rim, whereby to permit of the requisite yield to the end members 4 and 8 for the purpose of disconnecting same, when the tire is to be removed.

In Figs. 8, 12, 13 and 14, there is shown a modification of the manner of splitting the base portion 1 of the rim. Said modification comprises a projection 40 having a portion 41 dovetailed into and rigidly secured by welding or otherwise to the end 4 of base 1. The outer end of projection 40 terminates with a straight or perpendicular edge 42. Said projection 40 is adapted to be housed in a corresponding recess 43 in end 8 of base 1 of the rim. The portion of base 1 of the rim, adjacent the projection 40 is cut on an incline rearward, forming an angle 44 with the incline of flanges 2—2, which are cut on bevel 3, as in the former construction. The angle 44 thus formed by the base 1 and flanges 2—2 is adapted to fit into a corresponding reëntrant angle in end 8.

In Fig. 11 base portion 1 of the rim is shown split on a bevel as illustrated in Figs. 8, 12 and 13, and the flanges 2—2 are split on a bevel 50, which has a greater incline with respect to base 1 than that shown in said Figs. 8, 12 and 13. The angle here formed is denoted 51. The portion of flanges 2—2 adjacent end 8 have each rigidly secured thereto a stud 52 corresponding in thickness to that of a flange 2, and adapted to have one-half of its surface projecting from said portion of said flange, whereby to form a locking means for flanges 2—2 adjacent end 4.

The locking mechanism for assembling the end members 4 and 8 heretofore described is simple and avoids any projections, whereby to inconvenience the mounting of the rim upon the felly of the wheel. The bevel of flanges 2—2 on end 4, as shown at 3 and at 50 is adapted to allow said end 4 to be lowered from its housing position in end 8 without drawing said end 4 backward any considerable distance.

Having thus described my invention, what I claim as new and desire to secure by Letters Patent, is:

1. In a rim having flanges, an end having a dovetailed projection, an other end having a mortise recess, adapted to house said dovetailed projection, whereby said ends may be detachably united, a wedge shaped projection formed on the outer edge of said dovetailed projection, a corresponding recess in the edge of said mortise recess, whereby said ends may be centered when being united, and said flanges adjacent said dovetailed projection cut on a bevel, whereby said ends may be conveniently united.

2. In a rim having flanges, an end having a dovetailed projection, an other end having a mortise recess, adapted to house said dovetailed projection, whereby said ends may be detachably united, a wedge shaped projection formed on the outer edge of said dovetailed projection and on the edge of the base portion of the rim adjacent said dovetailed projection, a corresponding recess formed in the edge of said mortise recess, and in the base portion of the rim adjacent said recess, whereby to receive the corresponding wedge shaped projections to center the ends when uniting same, and means for permitting said end portions to yield, whereby same may be easily detached.

Signed at Utica, in the county of Oneida, and State of New York, this 1st day of December, 1911.

JAMES S. JOHNSTON.

Witnesses:
DAVID B. LISLE,
SAMUEL SLOAN.